(12) United States Patent
Weiss

(10) Patent No.: US 10,580,076 B2
(45) Date of Patent: Mar. 3, 2020

(54) VISUAL ASSIST FOR INSURANCE FACILITATION PROCESSES

(71) Applicant: Metropolitan Life Insurance Co., New York, NY (US)

(72) Inventor: Amir Weiss, New York, NY (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 0 days.

(21) Appl. No.: 14/268,642

(22) Filed: May 2, 2014

(65) Prior Publication Data

US 2015/0187017 A1    Jul. 2, 2015

Related U.S. Application Data

(60) Provisional application No. 61/921,896, filed on Dec. 30, 2013.

(51) Int. Cl.
| | | |
|---|---|---|
| *G06Q 40/08* | (2012.01) | |
| *G02B 27/01* | (2006.01) | |
| *G06Q 50/16* | (2012.01) | |

(52) U.S. Cl.
CPC .......... *G06Q 40/08* (2013.01); *G02B 27/017* (2013.01); *G06Q 50/16* (2013.01); *G02B 2027/0178* (2013.01)

(58) Field of Classification Search
CPC ........ G06Q 40/08; G06Q 50/16; G02B 27/01; G02B 27/017; G02B 2027/0178
See application file for complete search history.

(56) References Cited

U.S. PATENT DOCUMENTS

| | | | | |
|---|---|---|---|---|
| 7,313,759 B2* | 12/2007 | Sinisi | ..................... | G06Q 10/00 715/203 |
| 8,019,629 B1* | 9/2011 | Medina, III | ........... | G06Q 40/08 705/4 |
| 8,095,394 B2* | 1/2012 | Nowak | .................. | G06Q 40/08 250/363.04 |
| 8,260,639 B1* | 9/2012 | Medina, III | ........... | G06Q 40/08 705/4 |
| 8,655,683 B2* | 2/2014 | Grundel | ................ | G06Q 10/10 705/2 |
| 8,712,806 B1* | 4/2014 | Medina, III | ........... | G06Q 40/08 705/4 |
| 8,805,707 B2* | 8/2014 | Schumann, Jr. | .......................... | G08G 1/096775 705/4 |
| 9,286,726 B2* | 3/2016 | Balram | ................... | G06F 3/011 |
| 2005/0147949 A1* | 7/2005 | Wilson | ................... | G09B 23/28 434/219 |
| 2006/0059021 A1* | 3/2006 | Yulman | ................. | G06Q 40/08 705/4 |
| 2006/0078853 A1* | 4/2006 | Lanktree | ............. | G09B 19/167 434/62 |

(Continued)

OTHER PUBLICATIONS

Bestwire, "Emerging Technologies Set to Change the Insurance Industry," Oct. 3, 2000, A.M. Best Co. Inc., 1-3 (Year: 2000).*

*Primary Examiner* — Kenneth Bartley
(74) *Attorney, Agent, or Firm* — Troutman Sanders LLP

(57) ABSTRACT

A wearable communication device that is selectively configured to assist in the implementation of insurance claims processing. The device is capable of voice-activated or touch-activated insurance claim processing instructions and assisting the user in implementing insurance processing function such as damage appraisals and the like.

10 Claims, 18 Drawing Sheets

(56) References Cited

U.S. PATENT DOCUMENTS

| | | | | |
|---|---|---|---|---|
| 2008/0052134 | A1* | 2/2008 | Nowak | G06Q 10/10 705/4 |
| 2008/0055410 | A1* | 3/2008 | DeKeyser | G08B 13/19621 348/143 |
| 2009/0265385 | A1* | 10/2009 | Beland | G06Q 40/08 |
| 2009/0326989 | A1* | 12/2009 | Schmitt | G06Q 40/02 705/4 |
| 2010/0110368 | A1* | 5/2010 | Chaum | G02B 27/017 351/158 |
| 2010/0162263 | A1* | 6/2010 | Kamalahasan | G06F 11/3414 719/313 |
| 2010/0174564 | A1* | 7/2010 | Stender | G06Q 10/10 705/4 |
| 2011/0161116 | A1* | 6/2011 | Peak | G06Q 10/067 705/4 |
| 2011/0213628 | A1* | 9/2011 | Peak | G06Q 40/08 705/4 |
| 2012/0123806 | A1* | 5/2012 | Schumann, Jr. | G08G 1/096775 705/4 |
| 2012/0224070 | A1* | 9/2012 | Burroff | H04N 5/23219 348/207.1 |
| 2013/0044042 | A1* | 2/2013 | Olsson | G02B 27/0176 345/8 |
| 2014/0143545 | A1* | 5/2014 | McKeeman | H04L 63/0853 713/168 |
| 2014/0245165 | A1* | 8/2014 | Battcher | G06Q 10/10 715/738 |
| 2014/0278578 | A1* | 9/2014 | Cantwell | G06Q 40/08 705/4 |
| 2014/0350970 | A1* | 11/2014 | Schumann, Jr. | G08G 1/096775 705/4 |
| 2015/0019266 | A1* | 1/2015 | Stempora | G06Q 40/08 705/4 |
| 2015/0026174 | A1* | 1/2015 | Nuggehalli | G06F 17/30038 707/736 |
| 2015/0026175 | A1* | 1/2015 | Nuggehalli | G06F 17/30038 707/736 |
| 2015/0106129 | A1* | 4/2015 | Kinney | G06Q 40/08 705/4 |

* cited by examiner

Claims Assist

*They see the MetLife Claims Assist application splash screen as the application loads.*

VISUAL ASSIST FOR INSURANCE FACILITATION PROCESSES

CROSS REFERENCE TO RELATED PATENT APPLICATIONS

The present application is a Non-Provisional application of U.S. Application Ser. No. 61/921,896, filed on Dec. 30, 2013, and claims priority to that application. The contents of that application are incorporated herein by reference.

FIELD OF INVENTION

The present invention resides in the field of data acquisition and data processing. More specifically, the present invention relates to data management in the insurance industry.

BACKGROUND

There are many activities in managing insurance operations that are facilitated by data processing and computer assistance. Insurance is in fact an industry that relies on computer-managed operations, and a foundational implementation of actuarial calculations. In operation, insurance companies compete by enhancing two aspects of their business. First, insurance companies strive to offer low rates for the management of risks—such as insurance against the damage and injuries associated with the operation of automobiles and other vehicles, and insurance to cover damage caused to other property. Second, insurance companies strive to offer outstanding service to its customers if and when an accident occurs. This involves a prompt and accurate assessment of the damage, and a fair estimate of the repair bill. A corollary of this is that the assessment of damage should also discern if the policy covers the damage—either as a threshold issue or at some other junction in the process.

Efficient management of insurance policies is often a neglected aspect of insurance business management. For example, while pricing and monitoring insurance for car and driving risks get substantial interest, the actual implementation of services by insurance companies after an accident or other claim-triggering event gets less attention. Claim processing, if done effectively, can result in substantial savings to policyholders and better service; collectively, these changes can establish long-term customer loyalty. A botched or inefficient accident investigation, on the other hand, can result in a myriad of problems—some immediate, others delayed—but in any event, problem-prone claims processing that can destroy customer satisfaction.

It was with this understanding of the continuing problems in handling insurance operations that formed the impetus of the present invention.

SUMMARY

It is an object of the present invention to provide an enhanced computer environment that efficiently prompts a claims adjuster through the processing of a select insurance claim.

It is yet another object of the present invention to provide a distributed application operable by insurance agents or adjusters in reviewing claims by policyholders.

It is still another object of the present invention to provide a computer software method that guides the operation of a central processor to facilitate the use of a visual-based communication portal built into a wearable communication device.

It is yet another object of the present invention to provide a computer-controlled system including a central server and a display and audio interface forming a remote terminal for implementing a sequentially driven insurance operating algorithm for assisting in claims management.

The above and other objects of the present invention are realized in one embodiment that connects a wearable, visual-based communication device, preferably in the form of a pair of eye glasses, that places at least one small display in the field of view of the device user with a processor and audio command receiver to permit interactive operation of an insurance process, controlled via a remote server in communication with the communication device.

In accordance with the variations of the present invention, the communication device may further comprise a camera, microphone, control switches and a small speaker for audio output. An onboard processor controls all operations on the device and communicates to a remote computer via cellular, Wi-Fi, Bluetooth or similar wireless communication protocol. The communication device may further comprise other sensors that capture other local environmental data, such as a clock, thermometer, humidity sensor, barometer, altitude sensor and the like. The communication device may also comprise one or more geolocation sensors to ascertain the location of the device based on signals from GPS or other geolocation systems.

The operation is program driven. In accordance with control instructions, data is collected from the system sensors, displayed and stored as needed. User guidance is provided in the form of displayed instruction, directing the user to ascertain the requested information, either by selective video or image capture and/or prompted questions with respect to the information required. For example, witness interviews can be accomplished with full video/audio and properly arranged questions to discern fast and accurate information regarding a claim event. As data is collected it can be stored or discarded depending on its value.

FIGURES OF DRAWINGS

FIG. 3A depicts an illustrative graphical interface with text "8:15 ok glass" presented to a user.

Figure 3A:
FIGS. 3A through 3P depict in the upper right hand corner an illustrative series of visual/text views presented to a user during operation of the inventive system.
Figure 3B:
FIG. 3B depicts an illustrative graphical interface with text "ok glass, show me today's claim appointments" presented to a user.
Figure 3C:
FIG. 3C depicts an illustrative splash screen graphic with text "MetLife claims Assist" presented to a user.
Figure 3D:
FIG. 3D depicts an illustrative graphical interface with text "9:00 Juan-Carlos Morales, Car accident report, Hollywood 3.2 miles away" presented to a user.
Figure 3E:
FIG. 3E depicts an illustrative graphical interface with text "Directions" presented to a user.
Figure 3F:
FIG. 3F depicts an illustrative graphical interface with text "5:23 ok glass" presented to a user.
Figure 3G:
FIG. 3G depicts an illustrative graphical interface with text "ok glass, start a claim" presented to a user.
Figure 3H:
FIG. 3H depicts an illustrative splash screen graphic with text "MetLife claims Assist" presented to a user.
Figure 31:
Figure 3J:
FIG. 3I depicts an illustrative graphical interface with text "New claim" presented to a user.

FIG. 3J depicts an illustrative graphical interface with text "1. Scan vehicle VIN #" presented to a user. The module is prompting the user to capture the VIN number from the pictured vehicle.

Figure 3K:
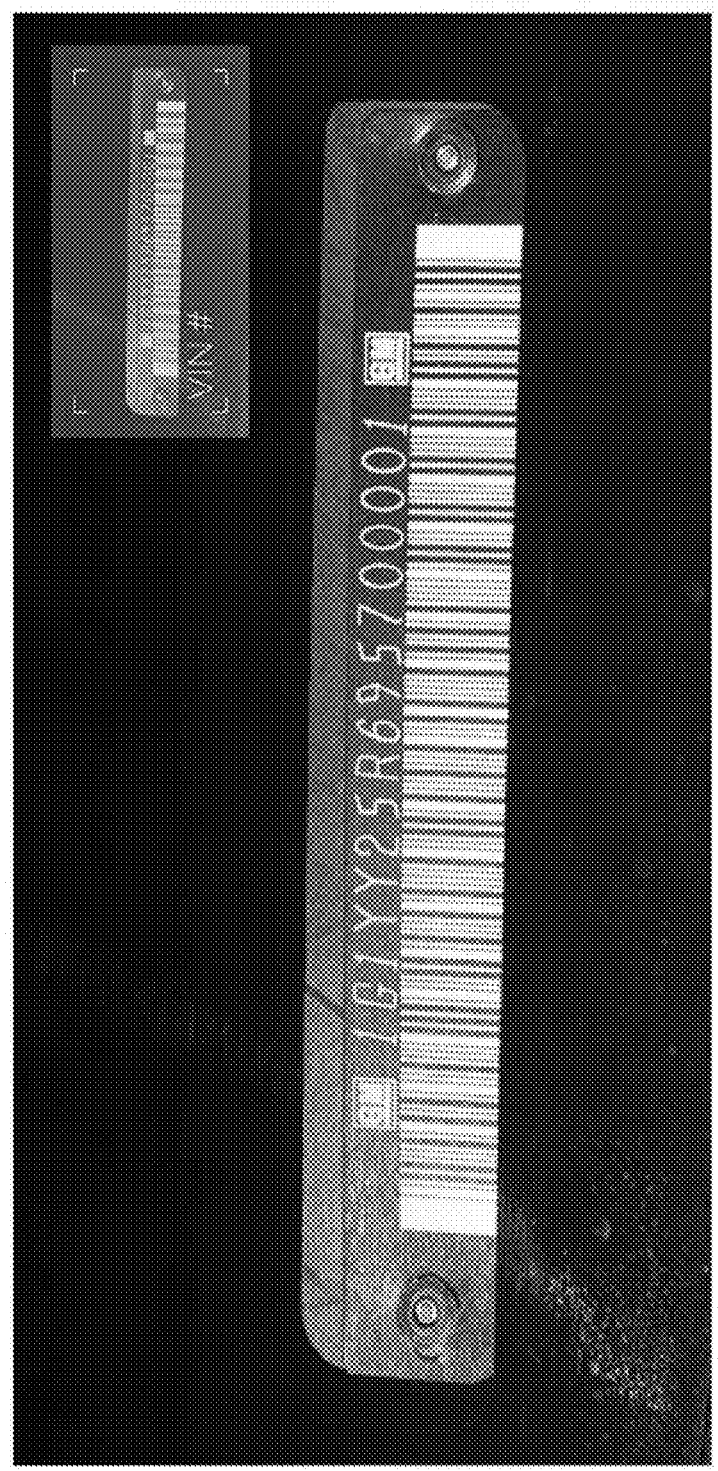

FIG. 3K depicts an illustrative graphical interface with a photograph of the bar code VIN # plate of a vehicle presented to a user.

Figure 3L:

FIG. 3L depicts an illustrative graphical interface with text "Is this car a white 2012 Ford Explorer?" presented to a user.

Figure 3M:

FIG. 3M depicts an illustrative graphical interface with text "3. Take photos of the front, rear, right and left side of the vehicle" presented to a user.

Figure 3N:
Figure 30:

FIG. 3N depicts an illustrative graphical interface with a photograph of the front of a vehicle and the text "FRONT" presented to a user.

FIG. 3O depicts an illustrative graphical interface with text "4. Describe the overall condition of the vehicle" presented to a user.

Figure 3P:

FIG. 3P depicts an illustrative graphical interface with text "The vehicle has damage in the front right side fender from" presented to a user.

DETAILED DESCRIPTION

The present invention relates to an adaptation of a generic technology relating to a device that collectively aggregates a processor, display screen/projector and a sensor arrangement conforming to an eyeglass appearance, to implement a program controlled protocol regarding the select operations necessary to complete an insurance claim under a policy, such as one that may be issued to cover the loss/damage to a car, vehicle, home, or other property. In alternative embodiment, the communication device is configured in another wearable format, such as a wristwatch, while providing similar or equivalent features and capabilities.

Figure 1:
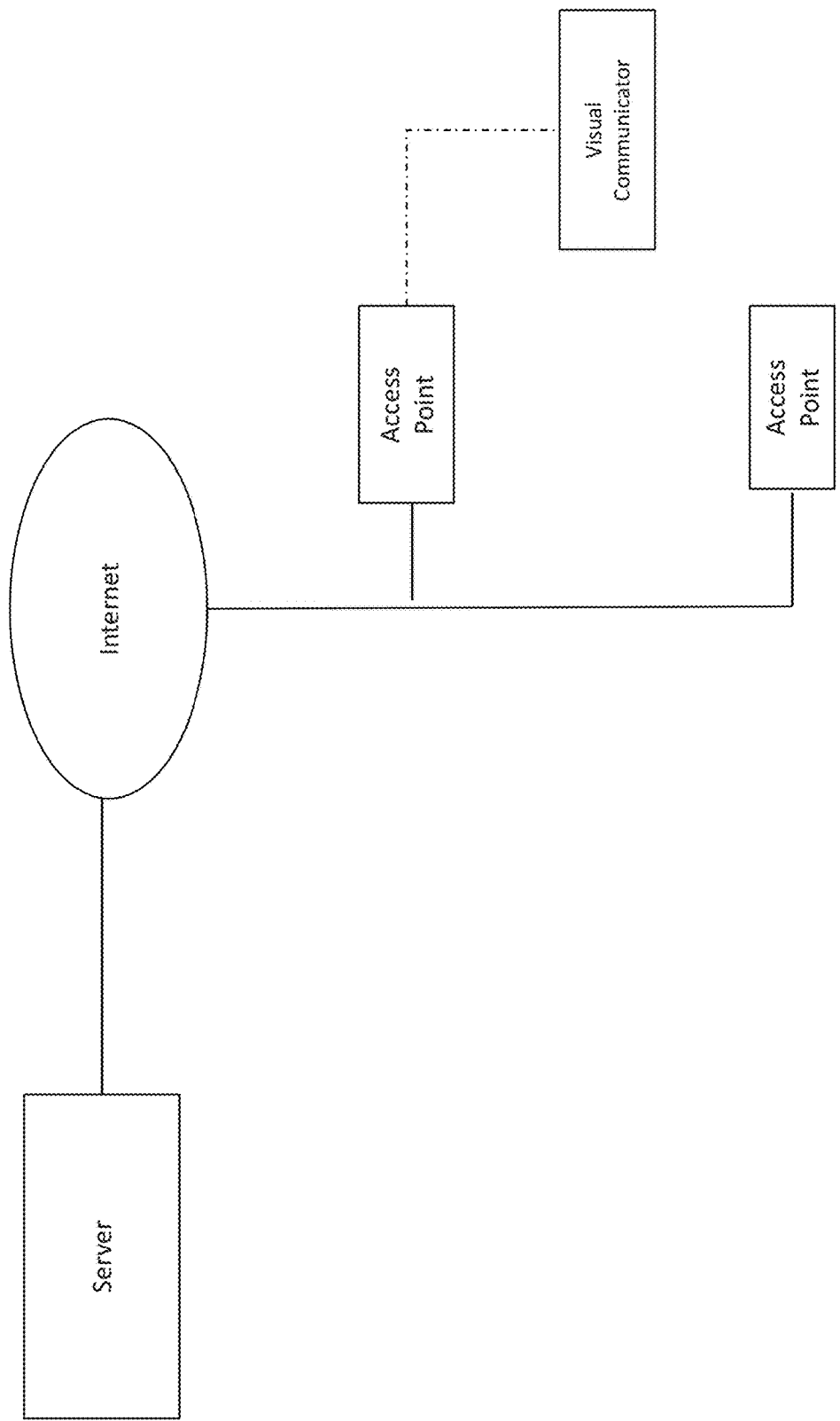
FIG. 1 depicts a working system environment for an illustrative embodiment of the present invention.

Beginning with FIG. 1, a system environment is depicted where a central server communicates over the Internet to one or more access points on a network. These access points permit communications to the communication device onboard the eyeglasses. Illustrative communication protocols between the eyeglasses and the access points include cellular, Wi-Fi, Bluetooth, ZigBee among others, recognizing that this communication pathway is best accomplished with a wireless link.

A recent breakthrough product has been developed by Google, Inc. and is the subject of U.S. patent application titled, "WEARABLE DEVICE WITH INPUT AND OUTPUT STRUCTURES," Ser. No. 13/212,686, now published: 2013/0044042 to Olsson, Maj Isabelle, et al., filed on Aug. 18, 2011—the contents of which are incorporated by reference as if restated in full herein. Use of a device conforming to the above is one preferred arrangement for the present invention. Support for the device to accomplish the objectives for the present invention resides in part in the programming for the specific implementation of the system, including programming for use in the system of FIG. 1; and in accordance with one arrangement with logic depicted in FIGS. 2 and 3.

Figure 2:
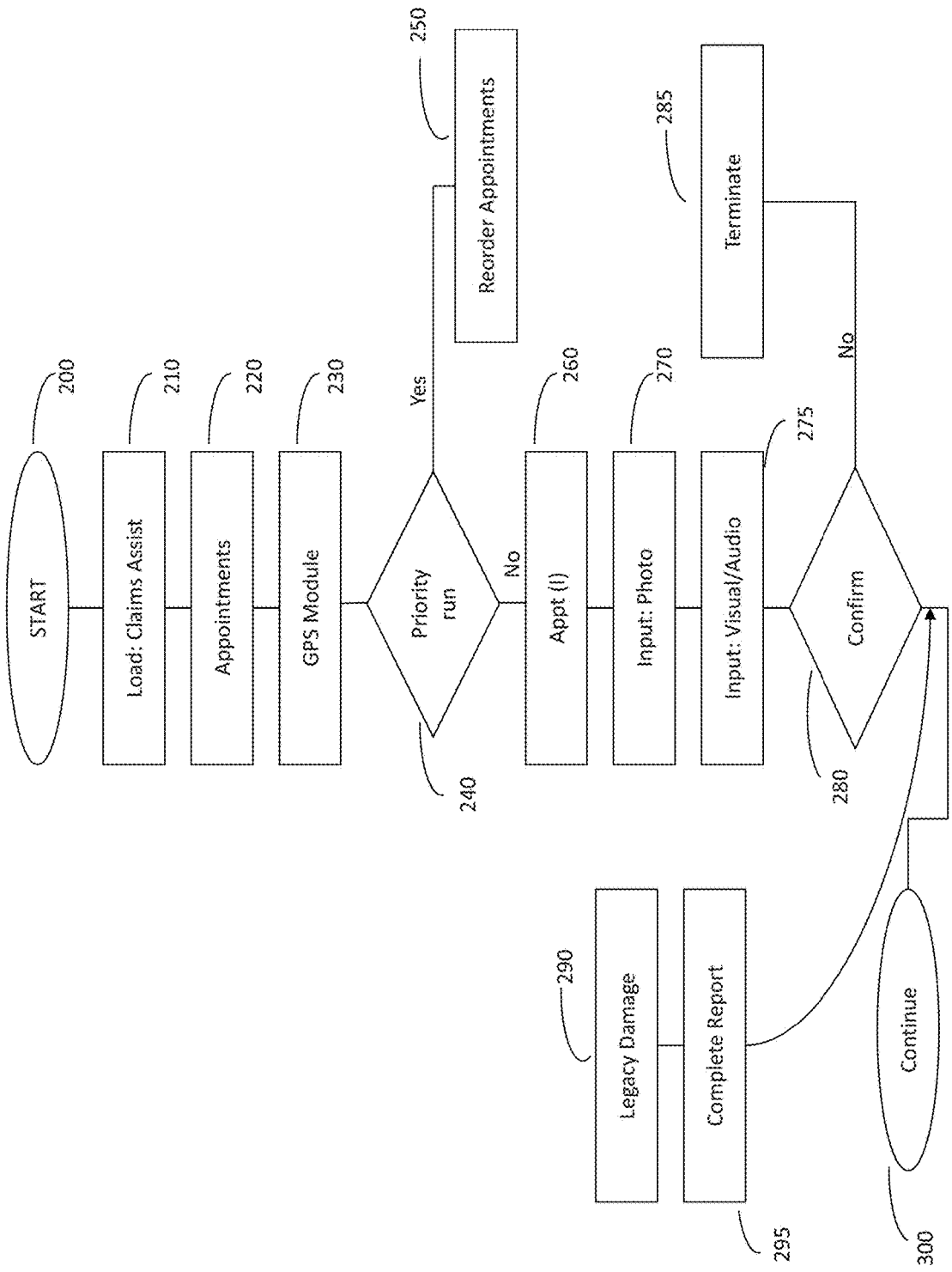
FIG. 2 is a flow-chart logic diagram for one implementation of the present invention, in accordance with the preferred embodiment discussed below.

Turning now to FIG. 2, the logic path of an illustrative system programmed for use in the context of an insurance application is provided. Logic begins conceptually at Start block 200 and continues to the first series of operations, blocks 210-220, with the application program identification of upcoming appointments for the User. Location data can be locally generated using onboard GPS, such as a GPS module 230, Wi-Fi location data and/or cellular tower triangulation data; or alternatively, developed remotely and submitted to the User—see for example, FIG. 3. At block 240 of FIG. 2, operation then prioritizes appointments in accordance with a selected algorithm. A simple example would prioritize appointments based on the time of submission of the claim; other more complex algorithms would plan the travel itinerary to maximize responsiveness—for example, by ordering appointments at block 250 based on the least amount of travel time or distance.

Continuing with FIG. 2, whether prioritized or not, the first appointment, APPT(I) block 260 is queued up for response. On-site, at the scene of the appointment, the system, through visual and/or audio prompts, provides the user with a controlled workflow for the collection of relevant data, such as input 270, from the scene. This may be in the form of instructions to the user to capture input 275, such as specific audio, images (i.e. photos), and/or video recordings. The instructions may also prompt the user to ask questions and/or verbalize statements to the policy holder as required by the policies of the insurance provider. For example, the device may prompt the user to ask the policy holder a list of questions to identify the policy holder, gain relevant information about the accident, and ascertain the mental state of the driver of the insured vehicle. In another example, the device may be programmed to prompt the user to read relevant portions of the policy holder's individual insurance policy to remind him or her of their rights and obligations under their policy. In one embodiment, the instructions appear in the user's field of view on the device's display screen. Other relevant data to be captured on-site may include, for example, photos of the damaged vehicle, the bar code for the Vehicle Identification Number (VIN) of the vehicle, identifying any legacy damage 290 from DMV records. In one embodiment, the user provides voice commands to control the capture of audio, video, and/or images through the device sensors. For example, once the user aims the device camera to achieve the desired composition, he can activate the camera shutter by speaking the command "ok glass, take a picture." The device may be programmed to accept other customized voice commands or other actions such as blinking an eye in line with the individual organization's procedures.

The communication devices provide a platform for the collection of a large set of data valuable to processing claims. For example, the device may be configured to prompt the user to capture video and/or audio interviews of witnesses to the accident. Using the geolocation data, the device may be configured to map the relevant points of the accident scene by prompting the claim adjuster to position the device and/or his person at the insured vehicle, intersection, other vehicles involved in the accident, etc. and the respective geolocation data would be stored to memory.

For example, at test 280, the system confirms that the car is the insured car—if not, logic branches to block 285 and the run is terminated. Assuming accurate car ID, the Report is generated, block 295 and the process continues to the next APPT(I), block 300.

Turning now to FIG. 3, a series of visual presentations reflecting the user's experience are presented. In particular, an insurance representative will activate the glasses at the start of their day and begin the protocol outlined above regarding FIG. 2. As can been seen by moving in sequence through each of the visual representations, the communication device provides suggested activities in response to select inputs from the user, collects visual information in the form of photos, video and the like, scans bar codes, detects voice instructions and provides text based information during the claims processing operations. The communication device thus provides a consolidated flow of data between the central data server and the insurance representative.

The direct prompting and instruction of the claims adjuster at the scene of the claim provides the benefit of increased control over the insurance policy holder experience. On-site data collection procedures may be defined and updated at the administrator level to be published system-wide to the communication devices. Claims adjusters need only to follow the prompts on the communication devices to execute the published procedures without requiring formal training.

Expanding on this concept, the communication device may be further programmed to feature training or practice modes for claims adjusters wishing to learn proper procedures, keep apprised of procedural changes or hone their existing skill By utilizing the wireless data link to the communication devices, the insurance provider can monitor the location and actions of claim adjusters to further control the customer service experience, track performance, manage exposure to liabilities, protect assets, and exploit other benefits apparent to one of ordinary skill in the arts.

As data is collected in near instantaneous fashion, system databases are updated in real time, allowing for important financial information regarding liabilities to be quickly collected. This information is then centrally processed and used to inform global decisions by the sponsoring organization—including adjustments to borrowing needs and premium rates for future products and clients.

The disclosed technology may similarly be adapted for use by claims adjusters for other type of vehicle insurance, such as boat insurance, or other property damage insurance, such as homeowner's insurance. The claims adjuster would respond to claims in a similar manner described above using the device. Following prompts from the communication device, the claims adjuster collects data related to the damage to the property and the cause of the property in the form of photos, video, or voice annotations. Other types of data may be collected depending on the requirements of the insurance provider. The collected data is then sent wirelessly to a nearby computer or central data server for processing.

An additional aspect of the present invention involves witness statement recordations, where witness statements are video or audio recorded and stored for future use in resolving any legal disputes regarding liability. Importantly, system design, using artificial intelligence (A.I.) can make a scenario assessment and develop a line of questions directed to the specific circumstances associated with the claim under review.

To the extent that feedback is needed from off-site management, communications are quickly established to the appropriate remote personnel. The stored images and other records can be quickly assessed by off-site personnel and recommendations quickly relayed back to the adjuster for implementation. The device may be further configured to allow for live communications between users and remote personnel through audio and/or video transmissions.

If additional services are needed, such as a tow truck or special diagnostics for particularly complex damage claims, these can be quickly identified from lists of vendors locally displayed within the display field of the glasses, and used to determine availability, price and other logistics for use.

More sophisticated systems will include retina tracking for more intuitive commands triggered by eye movement alone.

System operation can be reprogrammed for additional field operations, such as competitive research in automotive design, and other commercial activities that are enhanced where multiple data is collected that includes image and video, and the interaction with the source or activity can be optimized by prompts provided in real time to the user.

Flexible designs will allow applications throughout the insurance operations, but in particular in field operations where disparate data—weather conditions, lighting etc.—can be collected. This will include accident investigations, fraud investigations, damage assessments, OSHA and other regulatory compliance and the like. In each instance, programming provides the protocol for users, directing them to collect and discern optimized data to answer the critical questions in a rapid, accurate and efficient fashion.

Remote servers collect and organize incoming data from multiple users of the eye wear, building and expanding on a data set in real time that has significant supplemental market value. This includes selling the data stream to finance and investment banks for use in guiding market decisions based on perceived shifts in key indicators such as short term interest rates and various insurance market indices. The collection of large amounts of localized environmental data could also be valuable for traffic analysis, city planning, and weather studies. The unprecedented amount of data collected across numerous and diverse automobile accidents could also be valuable to car manufacturers, insurance providers, and vehicle safety standards bodies.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wearable communications device, in the form of eyeglasses, configured to be worn by a claim adjuster, comprising:
   a display screen;
   a digital camera;
   a microphone;
   a geolocation sensor; and
   a processor coupled to the display screen, the digital camera and the microphone, the processor programmed to:
      display, in the display screen, an appointment for the claim adjuster to attend to, wherein the display screen displays a vehicle accident report and a location of the vehicle accident as part of the appointment;
      receive a first voice instruction, as detected by the microphone, from the claim adjuster requesting a direction to the vehicle accident;
      display in the display screen the direction to the vehicle accident in response to the first voice instruction;
      receive a second voice instruction, as detected by the microphone, from the claim adjuster to start a new insurance claim;
      display in the display screen an application for starting the insurance claim in response to the second voice instruction;
      display in the display screen an instruction to the claim adjuster to scan a vehicle identification number;
      display in the display screen a scan window to scan the vehicle identification number with the digital camera;
      scan the vehicle identification number with the digital camera;
      display in the display screen a request for confirmation of make and model of the vehicle;
      receive a response to the request for confirmation from the claim adjuster;
      display in the display screen an instruction to the claim adjuster to take a photo of the vehicle;
      display in the display screen a scan window to take the photo of the vehicle by the digital camera;
      receive a third voice instruction, as detected by the microphone, from the claim adjuster to take the photo;
      take the photo of the vehicle using the digital camera after receiving the third voice instruction;
      display in the display screen an instruction to the claim adjuster to describe a condition of the vehicle;
      receive a fourth voice instruction, as detected by the microphone, from the claim adjuster describing the condition of the vehicle;
      transcribe the fourth voice instruction;
      store the transcribed fourth voice instruction to a memory;
      prompt the claim adjuster in the display screen to ask an insurance policyholder a plurality of questions to identify the policyholder;
      prompt the claim adjuster in the display screen to obtain from the policyholder information of an accident involving the vehicle insured by the policyholder;
      prompt the claim adjuster in the display screen to capture at least one of video and audio interviews of an eyewitness to the accident;
      determine geolocation information of the accident based on the geolocation sensor;
      map the geolocation information with the scene of the accident;
      store the visual information of the vehicle and the scene with the geolocation information to the memory;
      wirelessly transmit data stored in the memory to a remote server via a wireless communication protocol;
      receive from the remote server a recommendation of the insurance claim; and
      display a list of vendors in the display screen based on the insurance claim.

2. The device of claim 1 wherein the wearable communication device is further configured to have an appearance of eyeglasses, wherein the display screen displays a dynamic user interface disposed within the claim adjuster's field of vision.

3. The device of claim 1 wherein the wearable communication device is in the form of a wrist watch.

4. The device of claim 1 wherein the digital camera is configured to capture at least bar code data.

5. The device of claim 1 wherein the processor operates to collect data related to an automobile insurance policy.

6. The device of claim 1 wherein the processor comprises instructions to obtain location data of the accident.

7. The device of claim 1 wherein the processor comprises instructions to the claim adjuster to provide identification of the policyholder.

8. The device of claim 1 wherein the processor comprises instructions to the claim adjuster to provide information about the mental state of the driver involved in the accident.

9. The device of claim 8 wherein the processor comprises instructions to provide an audio or video recording of a statement from the eyewitness.

10. The device of claim 1 wherein the processor comprises instructions to the claim adjuster to provide information about an automobile accident.

\* \* \* \* \*